United States Patent
Puzio et al.

(10) Patent No.: US 8,348,695 B2
(45) Date of Patent: Jan. 8, 2013

(54) CORD PROTECTOR FOR POWER TOOLS

(75) Inventors: Daniel Puzio, Baltimore, MD (US);
Robert Opsitos, Felton, PA (US);
Richard C. Nickels, Jr., Hampstead, MD (US)

(73) Assignee: Black & Decker Inc., Newark, DE (US)

( * ) Notice: Subject to any disclaimer, the term of this patent is extended or adjusted under 35 U.S.C. 154(b) by 1227 days.

(21) Appl. No.: 12/164,650

(22) Filed: Jun. 30, 2008

(65) Prior Publication Data

US 2009/0004909 A1    Jan. 1, 2009

Related U.S. Application Data

(63) Continuation-in-part of application No. 11/860,989, filed on Sep. 25, 2007.

(60) Provisional application No. 60/863,467, filed on Oct. 30, 2006.

(51) Int. Cl.
*H01R 13/56* (2006.01)

(52) U.S. Cl. ............... 439/449; 439/470; 174/153 G

(58) Field of Classification Search .......... 439/470–473, 439/449, 447, 456; 174/153 G
See application file for complete search history.

(56) References Cited

U.S. PATENT DOCUMENTS

| | | | |
|---|---|---|---|
| 1,098,775 A | 6/1914 | Wheelock | |
| 1,880,069 A | 9/1932 | Becker | |
| 1,950,036 A | 3/1934 | Preston | |
| 2,365,785 A | 12/1944 | Tinnerman | |
| 2,800,933 A | 7/1957 | Michael | |
| 2,945,085 A | 7/1960 | Billups | |
| 3,056,852 A | 10/1962 | Sachs | |
| 3,123,662 A | 3/1964 | Fink | |
| 3,240,502 A | 3/1966 | Snyder | |
| 3,279,014 A | 10/1966 | Fishcer | |
| 3,546,502 A | 12/1970 | Botefuhr et al. | |
| 3,689,014 A | 9/1972 | Fink | |
| 3,958,300 A | 5/1976 | Tanaka et al. | |
| 4,078,309 A | 3/1978 | Wilson | |
| 4,095,043 A | 6/1978 | Martin et al. | |
| 4,289,923 A | 9/1981 | Ebert | |
| 4,323,725 A | 4/1982 | Muller et al. | |
| 4,389,082 A | 6/1983 | Lingaraju | |

(Continued)

FOREIGN PATENT DOCUMENTS

DE    3820741    12/1989

(Continued)

OTHER PUBLICATIONS

Frisch, Ulrich—Partial Search Report on corresponding European Patent Application No. 09151463.8—Apr. 14, 2009—Munich.

(Continued)

*Primary Examiner* — Gary F. Paumen
(74) *Attorney, Agent, or Firm* — Harness, Dickey & Pierce, P.L.C.

(57) ABSTRACT

A power tool having a housing, a motor disposed in the housing, a power cord connected to the motor, and a cord protector operably engaging the power cord for movement therewith. The cord protector comprises a cam follower bracket having a camming slot sized to receive a cam follower. The cam follower bracket being biased into an initial position and exerting a biasing force upon the power cord in response to a load being applied to the power cord.

16 Claims, 7 Drawing Sheets

U.S. PATENT DOCUMENTS

| | | | |
|---|---|---|---|
| 4,406,064 A | | 9/1983 | Goss |
| 4,787,145 A | | 11/1988 | Klicker et al. |
| 5,850,698 A | | 12/1998 | Hurn et al. |
| 6,152,639 A | | 11/2000 | Hsu |
| 7,727,003 B2 | * | 6/2010 | Ceroll et al. .................. 439/447 |
| 7,750,509 B2 | * | 7/2010 | Anderson ..................... 307/115 |
| 8,035,955 B2 | * | 10/2011 | Parks et al. .............. 361/679.01 |
| 2004/0147160 A1 | | 7/2004 | Weiss |
| 2009/0000821 A1 | * | 1/2009 | Parks et al. ................... 174/665 |
| 2009/0145520 A1 | * | 6/2009 | Opsitos et al. ................ 144/108 |

FOREIGN PATENT DOCUMENTS

| | | |
|---|---|---|
| DE | 20119603 U1 | 2/2002 |
| DE | 10360373 B3 | 3/2005 |
| JP | 07-022761 A | 1/1995 |
| JP | 2007022761 A | 2/2007 |
| JP | 2007103253 A | 4/2007 |
| WO | WO-2006093718 A1 | 9/2006 |

OTHER PUBLICATIONS

European Search Report and Annex to the European Search Report Dated Jul. 17, 2009.

International Search Report and Written Opinion Mailed Feb. 16, 2010.

* cited by examiner

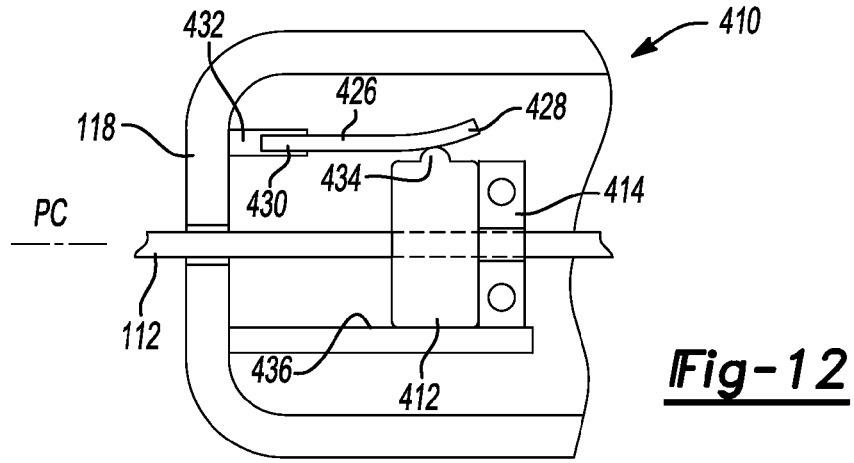
Fig-12
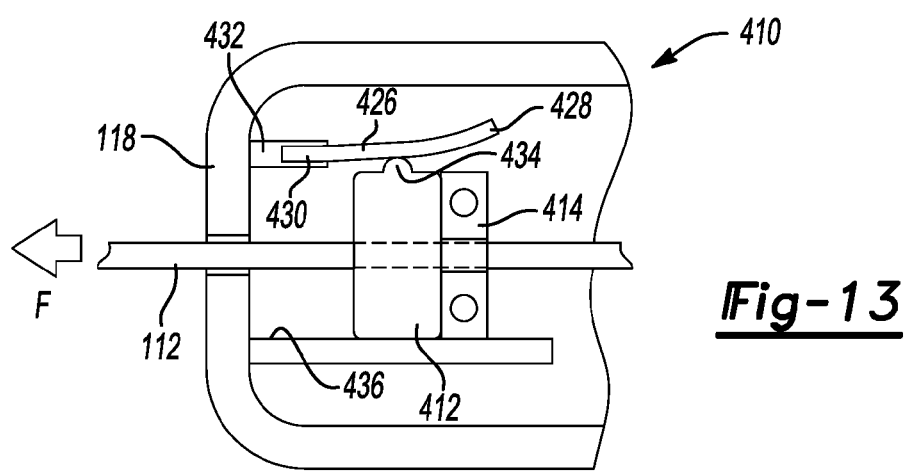
Fig-13
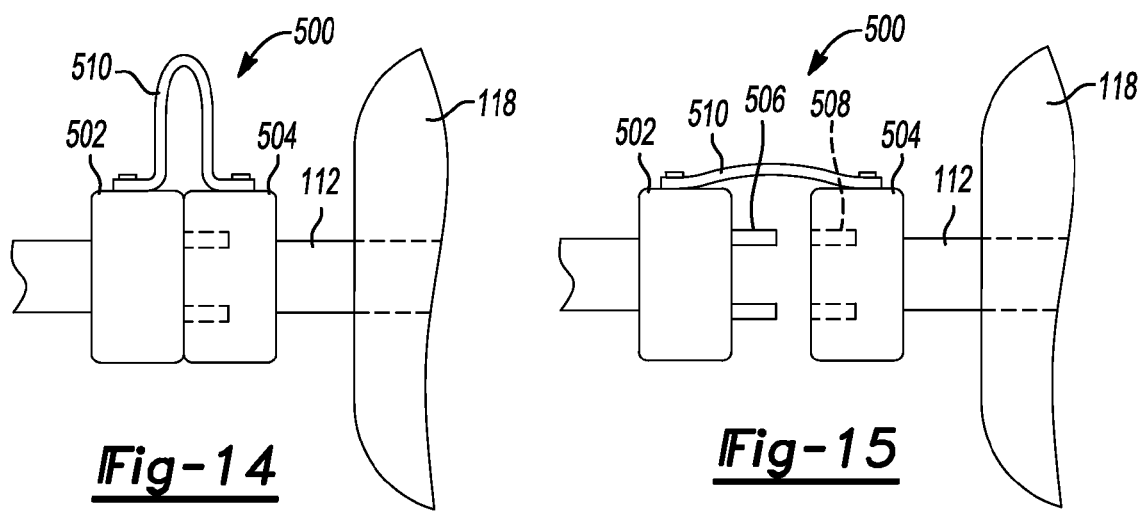
Fig-14
Fig-15

CORD PROTECTOR FOR POWER TOOLS

CROSS-REFERENCE TO RELATED APPLICATIONS

This application is a continuation in part of U.S. application Ser. No. 11/860,989 filed on Sep. 25, 2007, which claims the benefit of U.S. Provisional Application No. 60/863,467 filed on Oct. 30, 2006, the disclosure of which is incorporated herein by reference.

FIELD

The present disclosure relates to various improvements for power tools, and particularly to a cord set load protector.

BACKGROUND AND SUMMARY

The statements in this section merely provide background information related to the present disclosure and may not constitute prior art.

A common field failure with heavier portable power tools, such as portable saws, is a separation of the power cord from the tool due to an impulse load, or jerk, applied to the cord. This can occur when the tool is dropped while the plug end of the power cord is secured, or when a user carries the tool or lowers it from floor to floor or down a ladder by holding the power cord.

To isolate the power cord conductors or connections from the high forces imposed by jerking the power cord, the power cord according to the present disclosure is installed in the tool housing with a small service loop, or extra length of cable, between the cord clamp and the portion of the tool housing that secures the cord protector. A crimp-on device is installed on the power cord cable next to the cord protector. When the cord is subjected to jerking, the cable moves axially relative to the cord protector. As the cable moves, the crimp-on device compresses the extended end of the cord protector absorbing energy and reducing the forces transmitted to the cord set conductors or connections that are disposed within the housing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 12 is a front view of the cord set load protector design in an initial position according to some embodiments having a spring lever;

FIG. 13 is a front view of the cord set load protector design according to FIG. 12 in a deflected position;

FIG. 14 is a front view of the cord set load protector design in an initial position according to some embodiments having a breakaway connection;

FIG. 15 is a front view of the cord set load protector design according to FIG. 14 in a deflected position;

DETAILED DESCRIPTION

Figure 1:
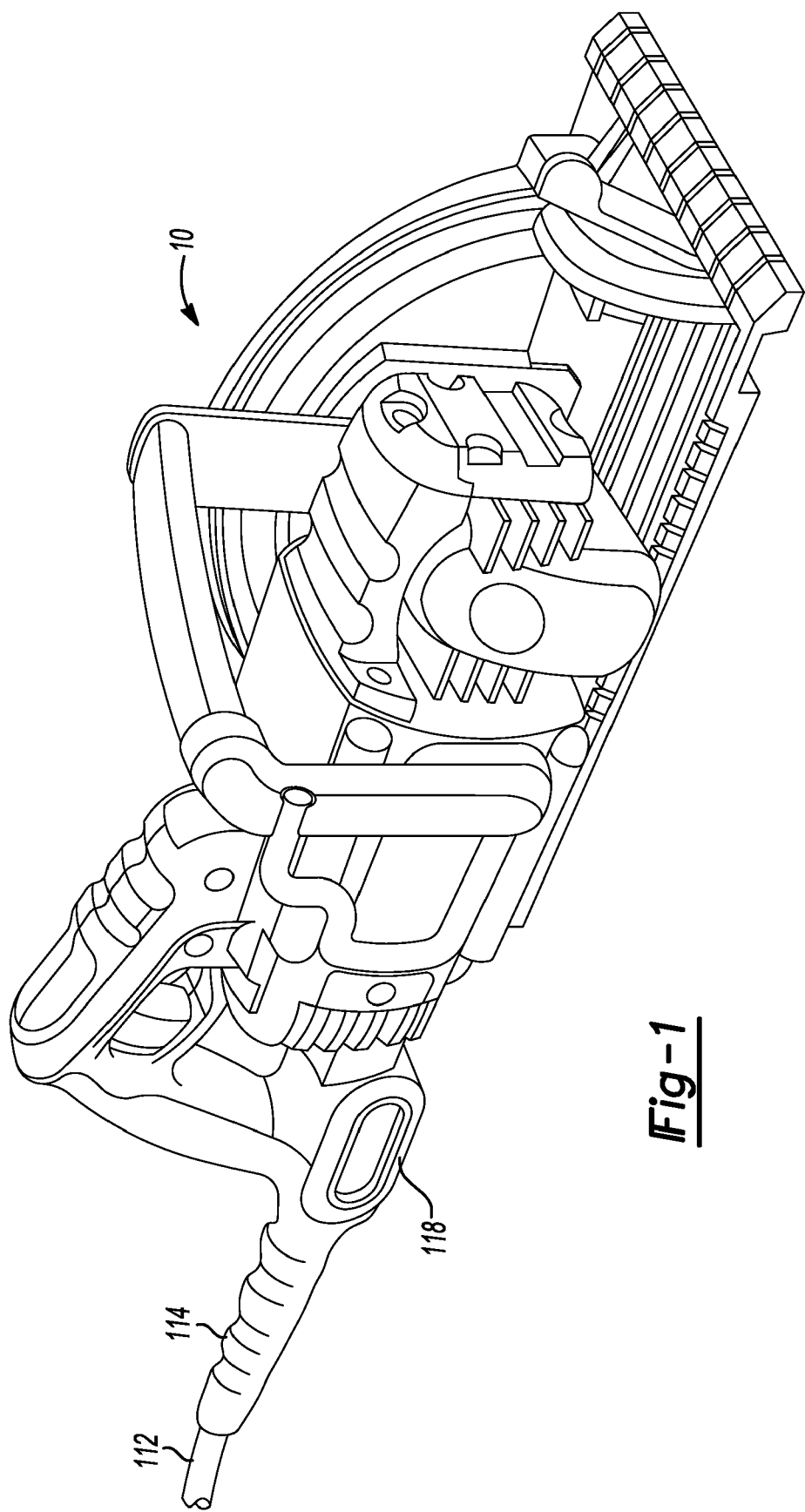
FIG. 1 is a perspective view of an exemplary worm drive saw with a tool hanger according to the principles of the present disclosure.

The following description is merely exemplary in nature and is not intended to limit the present disclosure, application, or uses. It should be understood that throughout the drawings, corresponding reference numerals indicate like or corresponding parts and features.

Figure 2:
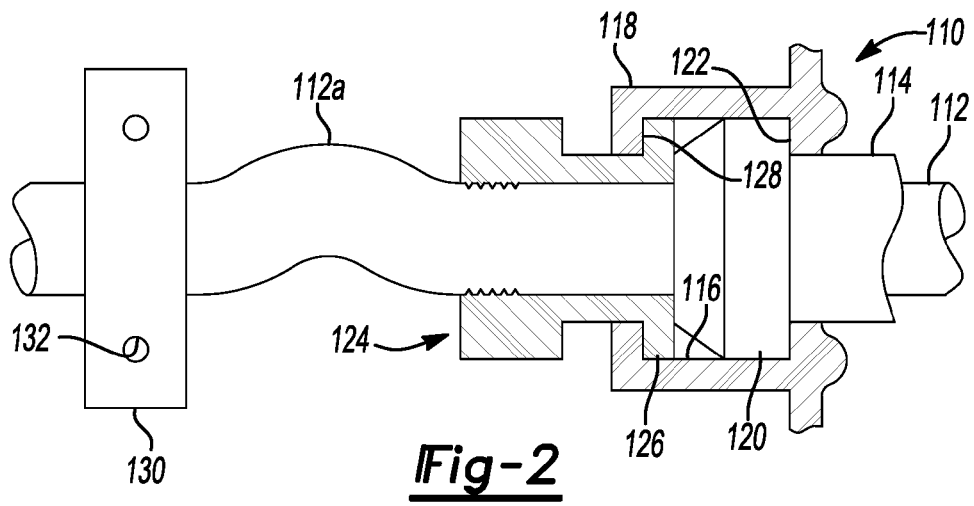
FIG. 2 is a cross-sectional view showing the cord set load protector according to the principles of the present disclosure, in an unloaded condition.

With reference to FIGS. 1 and 2, an exemplary power tool 10 is shown having a cord set load protector device 114 for preventing high forces imposed on a power cord 112 from impacting the connections of the cord 112 to the electrical power tool 10. As illustrated in FIG. 1, the power tool 10 includes a cord 112 and a cord protector 114 extending from the rear end of the tool. The cord protector 114 is mounted within a recess 116 provided in the power tool housing 118. The recess 116 can be square or round in cross-section and defines a cavity therein for receiving a radially extending flange portion 120 of the elastomeric cord protector 114. The radial extending flange portion 120 is disposed against a shoulder portion 122. A crimp-on device 124 is clamped or crimped onto the power cord 112 and includes a radially extending flange portion 126 which is disposed against an end portion of the cord protector 114 inside of the chamber 116 of housing 118. The flange portion 126 is disposed against a radially inwardly extending shoulder 128 of the cavity 116 provided in the housing 118.

The crimp-on device 124 engages the power cord so as to be axially and rotatably fixed to the power cord 112 in a manner that will be described in greater detail herein. The power cord 112 is also clamped to the tool housing by a cord clamp 130 provided within the power tool 10 in such a way that an extra cable length 112a is provided within the housing between the crimp-on device 124 and cord clamp 130. The cord clamp 130 can be mounted to the housing by fasteners 132 or by other known securing methods, such as rivets, welds, grommets, etc. The cord clamp 130 can be spaced from the recess 116 by up to several inches. Locating the cord clamp 130 further inward from the recess 116 improves cord flex durability by placing the cord stresses from the cord being flexed and the stresses on the cord due to the clamp at two different locations instead of both being generally at the same location. This improves the flex life of the conductors.

Figure 3:
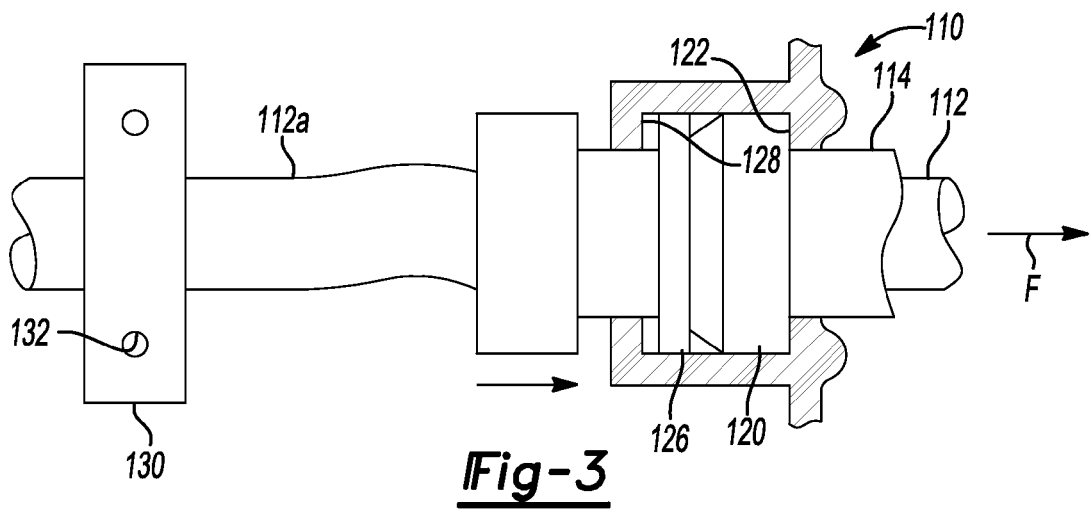
FIG. 3 is a view similar to FIG. 2 with a load applied to the cord.

When a large force F is applied to the power cord 112, as illustrated in FIG. 3, the power cord 112 is pulled in the axial direction of the force F. The movement of the power cord 112 relative to the housing 118 causes the crimp-on device 124 to move axially relative to the shoulder portion 128 so that the flange portion 126 of crimp-on device 124 compresses the flange portion 120 of cord protector 114, thereby absorbing the force exerted on the cord 112. The axial movement of the crimp-on device relative to the cord clamp 130 takes up some of the extra cable length 112a provided therebetween without exerting forces upon the cord clamp 130.

Figure 4:
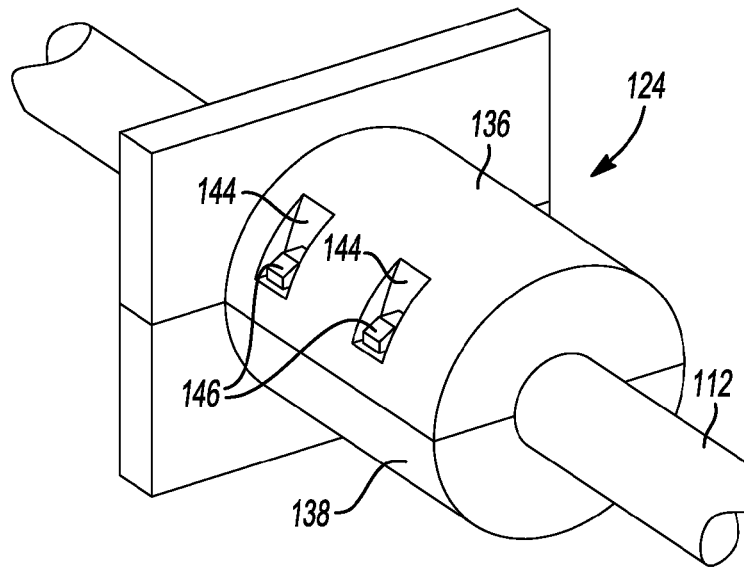
FIG. 4 is a perspective view of an exemplary cord clamp utilized with the cord set load protector according to the principles of the present disclosure.
Figure 5:
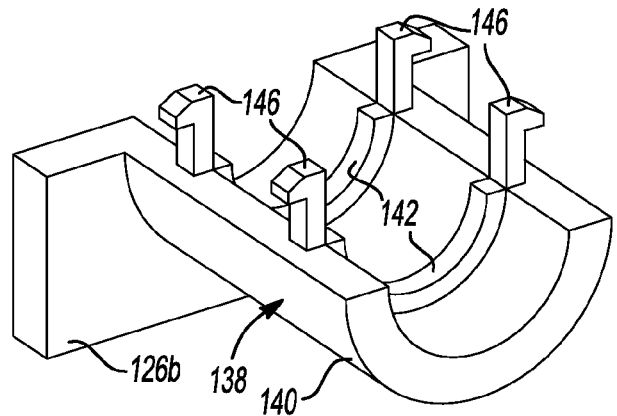
FIG. 5 is a perspective view of a first clamp half.
Figure 6:
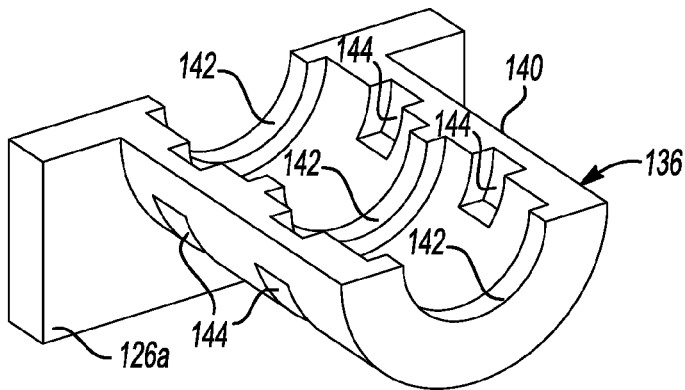
FIG. 6 is a perspective view of a second clamp half.

The crimp-on device 124 can take-on many forms. By way of example, as illustrated in FIGS. 4 and 6, the crimp-on device 124 can include a first clamp half 136 and a second clamp half 138. Each clamp half 136, 138 is provided with semi-cylindrical body portions 140 each provided with a plurality of radially inwardly extending ribs 142 designed to engage and clamp against the outer surface of the power cord 112. The first clamp half 136 is provided with a plurality of apertures 144 each adapted to receive a plurality of corresponding locking fingers 146 provided on the second clamp half 138. Each of the first and second clamp halves 136, 138 include radial flange portions 126a, 126b, respectively, which define the radially extending flange portion 126 of the crimp-on device 124. The locking fingers 146 secure the second clamp half 138 to the first clamp half 136 in a clamping engagement on the power cord 112 so as to prevent axial or rotational movement of the power cord 112 relative to the clamp device 124. It should be understood that other clamp or crimp-on arrangements can be utilized with the cord-set load protector 110, according to the principles of the present disclosure.

Figure 7:
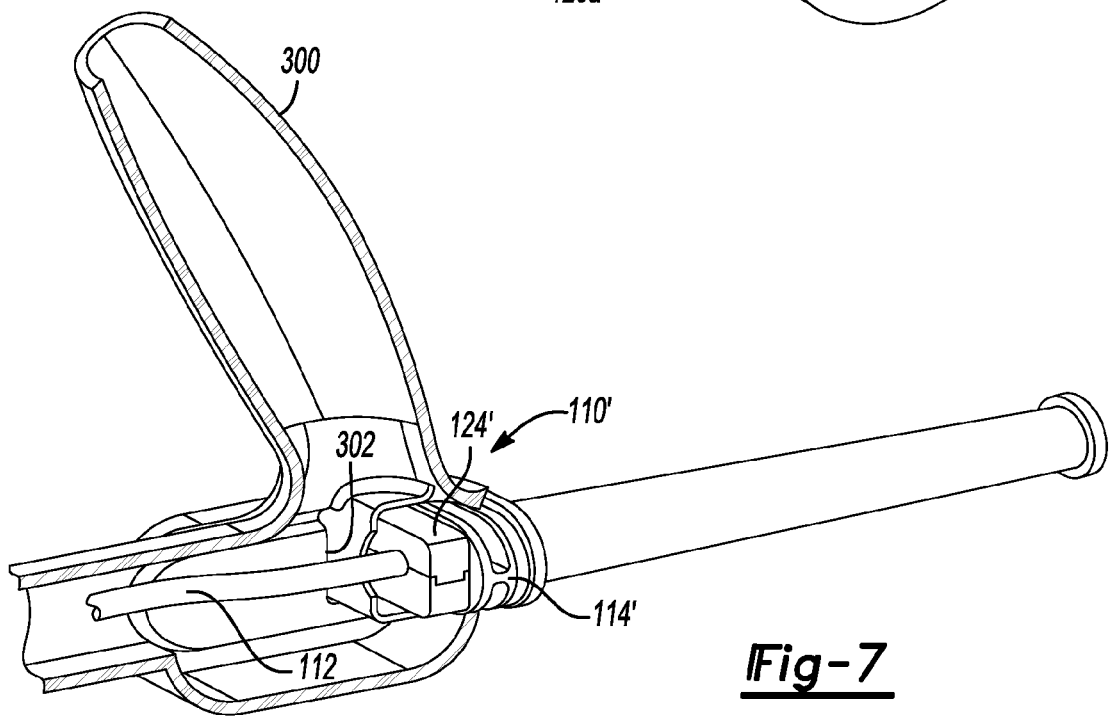
FIG. 7 is a perspective view of an alternative cord set load protector design with the handle partially removed for illustrative purposes.

With reference to FIG. 7, a cord set load protector 110' is shown including a split clamp device 124' received in a recess 302 within the handle section 300 to prevent the assembly from twisting or being pushed into the handle set. The split clamp 124' is independent of the handle set 300 and traps the complete cord set 112 and secondary wrap of filler strands. The cord protector 114' includes added material at the mounting end that prevents twist and creates a spring to absorb shock.

Referring now to FIGS. 8-11, in some embodiments, a biasing system 410 can comprise a plunger member 412 slidably disposed in housing 118. In some embodiments, plunger member 412 can be slidably disposed a plunger chamber 413 disposed in or formed as part of housing 118. It should be appreciated that plunger chamber 120 can be formed integral with housing 118 and thus is merely a portion of housing 118 or can be formed separate from housing 118 to form a subassembly positionable within housing 118.

Plunger member 412 is fixedly coupled to power cord 112 for movement therewith using a coupling member 414. Coupling member 414 can be formed in any form that permits joining of plunger ember 412 to power cord 112 for movement therewith. In some embodiments, coupling member 414 can comprise a clamping bracket having opposing sides threadedly joined together via fasteners to apply a clamping force to power cord 112. A compressible volume 416 is thus defined by plunger chamber 413, plunger member 412, and any other portion of housing 118, as desired.

Figure 8:
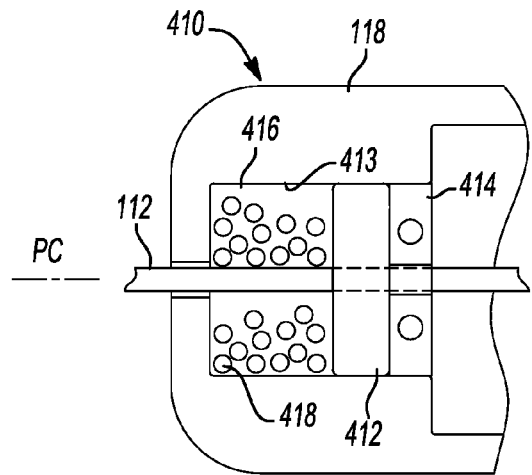
FIG. 8 is a front view of the cord set load protector design in an initial position according to some embodiments having a biasing media.
Figure 9:
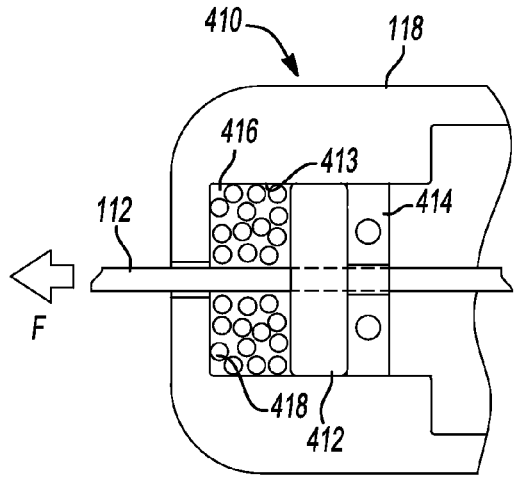
FIG. 9 is a front view of the cord set load protector design according to FIG. 8 in a deflected position.

In some embodiments, as illustrated in FIGS. 8 and 9, compressible volume 416 can comprise a biasing media 418 disposed therein. Biasing media 418 can include a plurality of elastomeric members shaped as balls, beads, pebbles, or various random shapes. This biasing media can be freely placed in compressible volume 416 to be piled, stacked, or otherwise grouped in response to movement of plunger member 412. That is, biasing media 418 can be free to flow or otherwise move within compressible volume 416 initially and yet will be otherwise restrained in a deflected position.

During use, if sufficient force is applied to power cord 112, power cord 112 is translated thereby similarly translating plunger member 412 relative to plunger chamber 413 to the left in the figures. This translation causes plunger member 412 to compress biasing media 418 against a wall of plunger chamber 413. The opposing biasing force of biasing media 418 being compressed against the walls of plunger chamber 413 thereby creates an opposing biasing force against movement of power cord 112 along axis PC. The spring rate of this opposing biasing force can be tailored to a predetermined biasing profile through the selection of the biasing media, including the selection of materials used, media sizes, media quantity, and the like. It should be appreciated that a mixture of differing media can be used.

Figure 10:
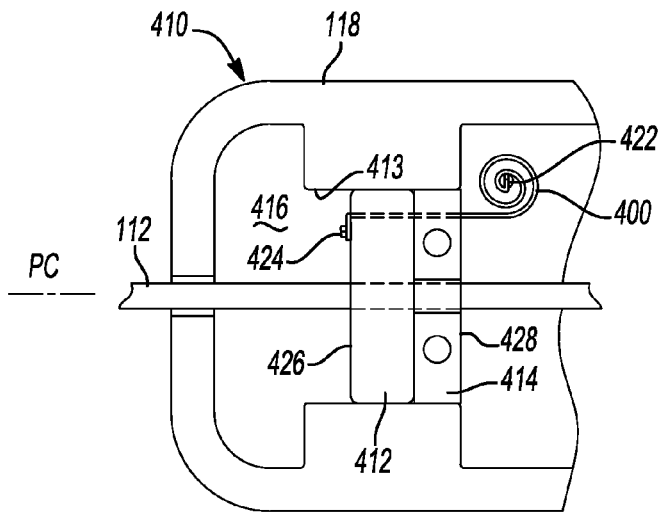
FIG. 10 is a front view of the cord set load protector design in an initial position according to some embodiments having a coil spring.
Figure 11:
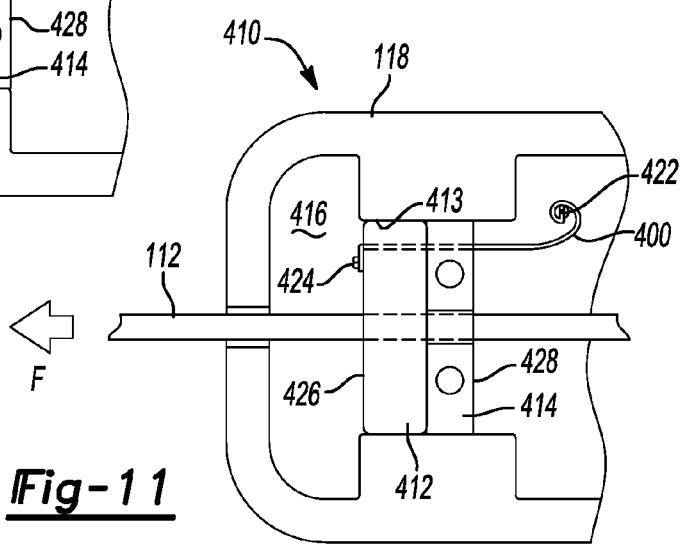
FIG. 11 is a front view of the cord set load protector design according to FIG. 10 in a deflected position.

In some embodiments, as illustrated in FIGS. 10 and 11, a spring coil member 420 can be coupled between housing 118 and plunger member 412 to provide an opposing biasing force to plunger member 412. In some embodiments, spring coil member 420 comprises a spring coil having a first end 422 fixedly coupled to housing 118 and an opposing second end 424 fixedly coupled to plunger ember 412. Spring coil member 420 can extend through a portion of plunger member 412 and coupling member 414 so as to be coupled to a face 426 of plunger member 412. However, it should be appreciated that spring coil member 420 can be fixedly coupled to a back side 428 of plunger ember 412 or coupling member 414.

During use, if sufficient force is applied to power cord 112, power cord 112 is translated thereby similarly translating plunger member 412 relative to plunger chamber 413 to the left in the figures. This translation causes plunger member 412 to draw second end 424 of spring coil member 420, thereby straightening spring coil member 420 creating an opposing biasing force against movement of power cord 112 along axis PC. The spring rate of this opposing biasing force can be tailored to a predetermined biasing profile through the selection of the material and spring characteristics of spring coil member 420.

In some embodiments, as illustrated in FIGS. 12 and 13, a spring cam lever 426 can be coupled to housing 118. Spring cam lever 426 can be a generally planar lever having an upturned end 428. A retaining end 430 of spring cam lever 426 can be fixedly coupled to housing 118 via a retaining feature 432 extending from housing 118. Retaining feature 432 can include a molded-in feature, such as a sleeve, for retaining retaining end 430 therein through an interference fit or other connection. Plunger member 412 can comprise a raised cam feature 434 extending from a side thereof and be slidably disposed in a guide slot 436. Raised cam feature 434 can be configured to engage and progressively deflect spring cam lever 426 in response to movement of power cord 112 and plunger member 412.

During use, if sufficient force is applied to power cord 112, power cord 112 is translated thereby similarly translating plunger member 412 relative to guide slot 436 to the left in the figures. This translation causes raised cam feature 434 to translate along spring cam lever 426 from upturned end 428 toward retaining end 430. As a result of the proximate location of raised cam feature 434 to spring cam lever 426, spring cam lever 426 is caused to progressively deflect from an initial position to a deflected position, thereby creating an opposing biasing force against movement of power cord 112 along axis PC. The spring rate of this opposing biasing force can be tailored to a predetermined biasing profile through the selection of the material and spring characteristics of spring cam lever 426.

In some embodiments, as illustrated in FIGS. 14 and 15, cord set load protector 110 can comprise a breakaway connection 500. Breakaway connection 500 can comprise a first cord half 502 and a second cord half 504 being electrically connectable via a male end connector(s) 506 extending from first cord half 502 and/or second cord half 504 and a female end connector(s) 508 disposed in first cord half 502 and/or second cord half 504. Male end connector(s) 506 and female end connector(s) 508 can be configured to define both an electrical connection and mechanical connection, wherein the mechanical connection is disconnectable in response to a predetermined load applied along power cord 112. Once this predetermined load is reached, the mechanical connection is broken, thereby disrupting the electrical connection. This predetermined load (i.e. a retaining force) can be chosen to be less than a known load that is likely to cause damage to power cord 112. A tether member 510 can be used to join first cord half 502 and second cord half 504 such that once the predetermined load is reached and the mechanical connection is disconnected, tether member 510 can retain first cord half 502 and second cord half 504 in close proximity for reconnection. Tether member 510 can be a strap member coupled to first cord half 502 and second cord half 504 via fasteners. Tether member 510 can be configured to provide a load carrying ability greater than the mechanical connection between first cord half 502 and second cord half 504.

Figure 16:
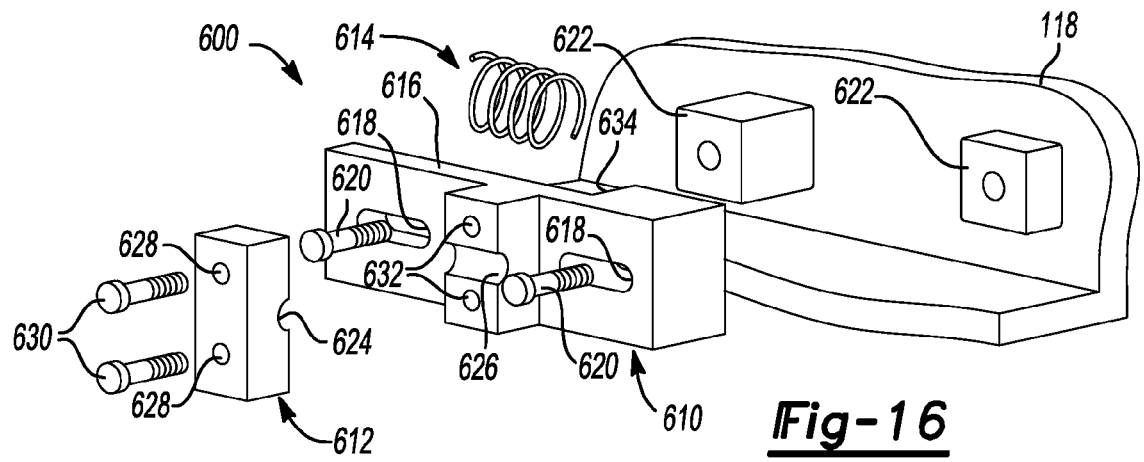
FIG. 16 is a perspective view of a cord set load protector design according to some embodiments having a cam follower.

Referring now to FIGS. 16-20, in some embodiments, cord set load protector 110 can comprise a biased cam assembly 600. Specifically, in some embodiments, biased cam assembly 600 can be disposed within housing 118 or, in some embodiments, can be formed outside of housing 118. With particular reference to FIG. 16, biased cam assembly 600 can comprise a cam follower bracket 610, a cord clamp bracket 612, and a biasing member 614. Cam follower bracket, in some embodiments, comprises a body portion 616 having one or more cam slots 618 each sized to receive a cam follower 620 (i.e. fastener) extending therethrough. Cam followers 620 and cam slots 618 are sized to closely conform to each other to provide a non-binding, camming movement. Cam followers 620 are configured to be threadedly received within a mounting structure 622 extending from housing 118 or other equivalent support structure.

In some embodiments, cord clamp bracket 612 can comprise a bracket body shaped to include a first power cord retaining slot 624 sized to complement a corresponding second power cord retaining slot 626 formed on cam follower bracket 610 and clampingly engage and retain power cord 112 therebetween (FIGS. 17-20). In this way, cam follower bracket 610 can move in concert with power cord 112.

In some embodiments, cord clamp bracket 612 can comprise a pair of enlarged apertures 628 for permitting a shank portion of fasteners 630 to pass through into a corresponding threaded aperture 632 formed in cam follower bracket 610. Upon tightening of fasteners 630, cord clamp bracket 612 is drawn toward cam follower bracket 610 to exert a clamping and retaining force on power cord 112. In this manner, cord clamp bracket 612 is fixedly coupled to power cord 112 for movement therewith.

Figure 17:
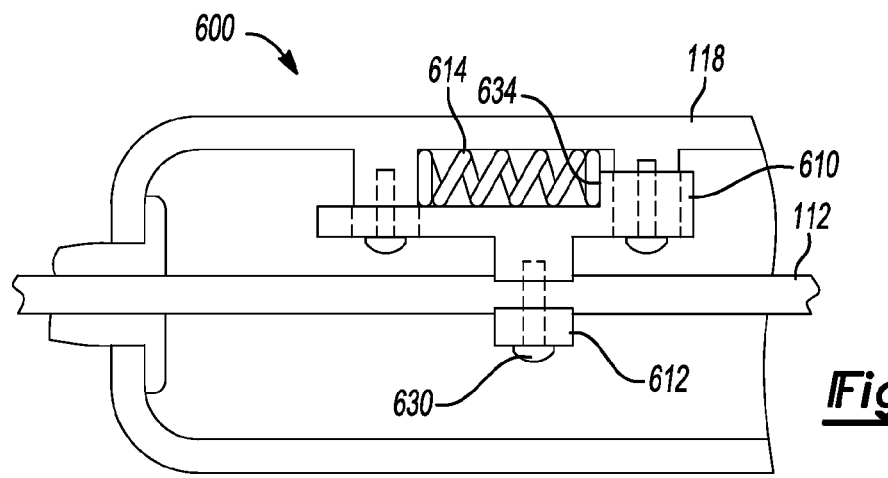
FIG. 17 is a front view of the cord set load protector design according to FIG. 16 in an initial position.
Figure 18:
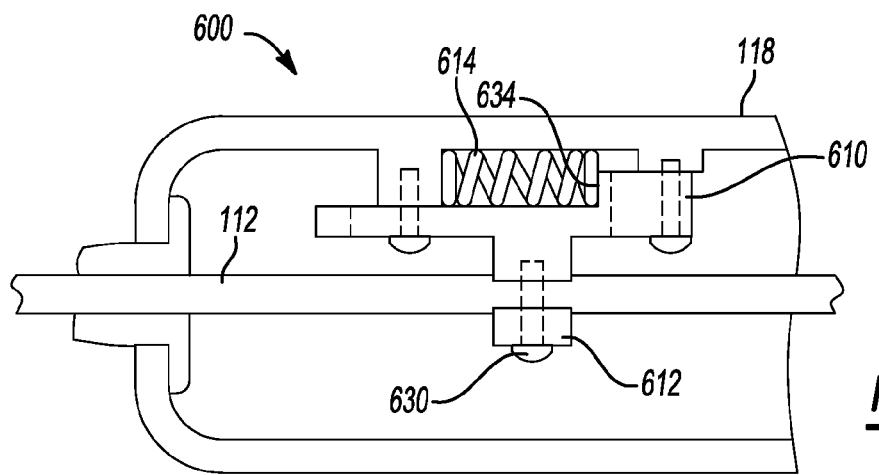
FIG. 18 is a front view of the cord set load protector design according to FIG. 16 in a deflected position.
Figure 19:
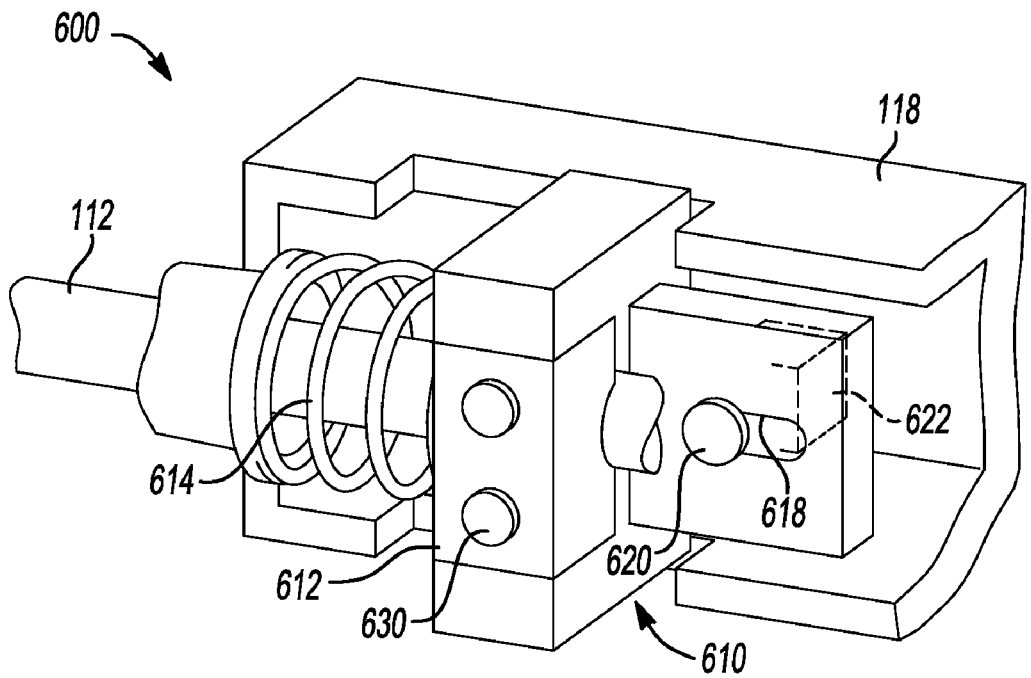
FIG. 19 is a perspective view of a cord set load protector design according to some embodiments having a cam follower in an initial position.
Figure 20:
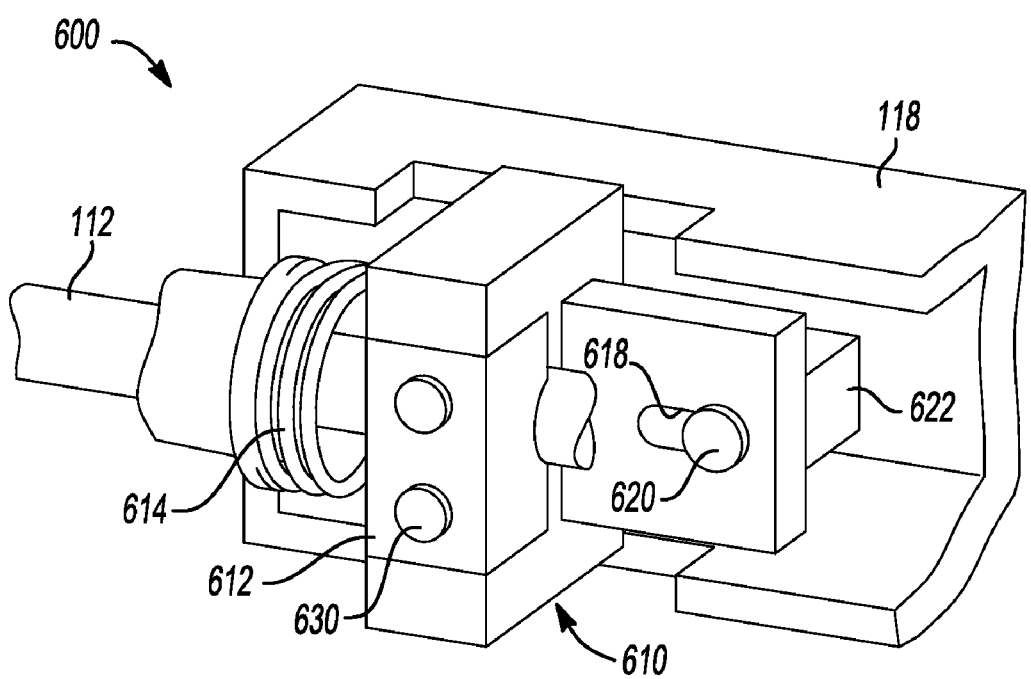
FIG. 20 is a perspective view of the cord set load protector design of FIG. 19 in a deflected position.

With continued reference to FIGS. 16-18, biasing member 614 can be disposed in a position between cam follower bracket 610 and housing 118 such that movement of cam follower bracket 610 to the left in the figures exerts a compression force on biasing member 614. Specifically, in some embodiments, biasing member 614 can be positioned such that an end of biasing member 614 engages a side wall of housing 118 or, more particularly, a sidewall of mounting structure 622. An opposing end of biasing member 614 can be positioned to engage a spring wall 634.

It should be appreciated that variations of biased cam assembly 600 can exist, such as for example biasing member 614 can be positioned such that an end engages a side wall of housing 118 and an opposing end thereof engages at least a portion of cord clamp bracket 612. In this manner, biasing member 614 can be disposed in coaxial relation to power cord 112.

During use, if sufficient force is applied to power cord 112, power cord 112 is translated thereby similarly translating cam follower bracket 610 to the left in the figures. Cam followers 620 slide within cam slots 618 to provide smooth, non-binding deflection. This translation causes biasing member 614 to compress thereby creating an opposing biasing force. This compression of biasing member 614 provides force absorption along axis PC.

It should be appreciated that biased cam assembly 600 can provide increased resistance to twisting and flexing forces exerted on power cord 112 during use due to the structure of the camming features.

It should also be appreciated from the foregoing that one or more of the disclosed embodiments can be used concurrently to provide improved tailoring of the biasing profile and increased cord protection.

What is claimed is:

1. A power tool, comprising:
   a tool body having a housing;
   a motor disposed in said housing;
   a power cord connected to said motor; and
   a cord protector operably coupled to said power cord for movement therewith, said cord protector comprising a cam follower bracket having a camming slot, said camming slot being sized to receive a cam follower, said cam follower bracket being biased into an initial position and exerting a biasing force upon said power cord in response to a load being applied to said power cord.

2. The power tool according to claim 1 wherein said cord protector further comprises a cord clamp bracket fixedly coupled to said cam follower bracket, said cord clamp bracket and said cam follower bracket together clampingly engaging and retaining said power cord.

3. The power tool according to claim 1 wherein said cam follower comprises a fastener slidably extending through said camming slot and threadedly engaging said housing.

4. The power tool according to claim 1, further comprising:
   a biasing member biasing said cam follower bracket into said initial position, said biasing member recovering to said initial position in response to removal of said load.

5. The power tool according to claim 4 wherein said biasing member is disposed between said housing and said cam follower bracket.

6. The power tool according to claim 4 wherein said biasing member is disposed between said housing and a spring wall formed on said cam follower bracket.

7. The power tool according to claim 4 wherein said biasing member is disposed coaxially with said power cord.

8. A power tool, comprising:
a tool body having a housing;
a motor disposed in said housing;
a power cord connected to said motor; and
a cord protector comprising a plunger member slidably disposed within a chamber, said plunger member being fixedly coupled to said power cord, said chamber having a biasing media disposed therein and generally compressible in response to movement of said plunger member relative to said chamber, said biasing media exerting a biasing force upon said power cord in response to a load being applied to said power cord.

9. The power tool according to claim 8, wherein said biasing media comprises a plurality of elastomeric members.

10. The power tool according to claim 9 wherein said plurality of elastomeric members are non-uniform.

11. The power tool according to claim 8 wherein said biasing media is freely moveable within said chamber in an initial position and generally restrained within said chamber in a deflected position.

12. A power tool, comprising:
a tool body having a housing;
a motor disposed in said housing;
a power cord connected to said motor; and
a cord protector comprising a plunger member slidably disposed within a chamber, said plunger member being fixedly coupled to said power cord, a spring coil member operably coupling said plunger member and said housing to provide a biasing force to said plunger member in response to movement of said plunger member relative to said chamber, said biasing force opposing a load being applied to said power cord.

13. A power tool, comprising:
a tool body having a housing;
a motor disposed in said housing;
a power cord connected to said motor; and
a cord protector comprising a plunger member slidably disposed within a chamber and a spring cam lever fixedly coupled on one end to said housing, said plunger member having a cam feature extending therefrom, said cam feature engaging and progressively deflecting said spring cam lever to provide an increasing biasing force to said plunger member in response to movement of said plunger member relative to said chamber, said biasing force opposing a load being applied to said power cord.

14. A power tool, comprising:
a tool body having a housing;
a motor disposed in said housing;
a power cord connected to said motor, said power cord having a breakaway portion disposed in said housing, said breakaway portion having a first half and a second half being releasably coupled and defining a retaining force, said breakaway portion being separable in response to a load being greater than said retaining force, said retaining force being less than force known to damage said power cord.

15. The power tool according to claim 14, further comprising:
a tether member fixedly coupled to said first half and said second half of said power cord, said tether member retaining said first half and said second half following separation of said breakaway portion.

16. The power tool according to claim 15 wherein said tether member defines a tether force retaining said first half and said second half, said tether force being greater than said retaining force.

* * * * *